US012572343B2

(12) United States Patent
Kairali et al.

(10) Patent No.: US 12,572,343 B2
(45) Date of Patent: Mar. 10, 2026

(54) SINGLE INSTALLATION AND INTELLIGENT MULTI SITE USAGE OF SOFTWARE VIA MOVING EDGE CAPACITY

(71) Applicant: International Business Machines Corporation, Armonk, NY (US)

(72) Inventors: Sudheesh S. Kairali, Kozhikode (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 863 days.

(21) Appl. No.: 17/568,783

(22) Filed: Jan. 5, 2022

(65) Prior Publication Data

US 2023/0214199 A1     Jul. 6, 2023

(51) Int. Cl.
*G06F 8/61*          (2018.01)
*H04W 8/02*         (2009.01)

(52) U.S. Cl.
CPC ................ *G06F 8/61* (2013.01); *H04W 8/02* (2013.01)

(58) Field of Classification Search
CPC ................................... G06F 8/61; H04W 8/02
See application file for complete search history.

(56) References Cited

U.S. PATENT DOCUMENTS

| | | | |
|---|---|---|---|
| 9,389,893 B2 | 7/2016 | Raghu | |
| 11,061,718 B2 | 7/2021 | Vukovic | |
| 11,461,123 B1 * | 10/2022 | Tsai | .................... G06F 9/45558 |
| 2021/0059011 A1 | 2/2021 | Fang | |

FOREIGN PATENT DOCUMENTS

WO     WO-2022055143 A1 *  3/2022 ............. H04L 67/63

OTHER PUBLICATIONS

"Application Migration", VMware, downloaded from the internet on Sep. 3, 2021, 8 pages, <https://www.vmware.com/topics/glossary/content/application-migration>.
"What is an Edge Data Center?", Sunbird DCIM, downloaded from the internet on Sep. 3, 2021, 7 pages, <https://www.sunbirddcim.com/edge-data-center>.
Sampera, Ernest, "Data Center Migration Tools for Parallel & Swing Migrations", vXchnge, Oct. 8, 2019, 8 pages, <https://www.vxchnge.com/blog/data-center-migration-tools>.

* cited by examiner

*Primary Examiner* — Suraj M Joshi
(74) *Attorney, Agent, or Firm* — Monchai Chuaychoo

(57)                  ABSTRACT

An approach for dynamically transitioning software associated with client devices in edge computing between one or more data centers is disclosed. The approach includes retrieving locations for one or more edges associated with one or more data centers; identifying data access location from client devices; determining mobility pattern associated with the data access by the client devices; identifying one or more data center services associated with the mobility pattern; determining one or more solutions associated with the mobility pattern based on an intelligent movement algorithm, the one or more data center services and the data access location; and applying the one or more solutions.

20 Claims, 4 Drawing Sheets

100

110

SERVER

116

DATABASE

111

CAPACITY
COMPONENT

101

102

Data Center 1

103

102

Data Center 2

103

300

302 retrieving locations for near edges and far edges

304 identifying edge access from client devices

306 determining mobility pattern associated with the edge access

308 identifying one or more data center services

310

Determining one or more solutions associated with edge capacity

312 applying one or more solutions

400

402 MEMORY

405 PERSISTENT STORAGE

407 COMMUNICATIONS UNIT

404

401 PROCESSOR(S)

403 CACHE

406 I/O INTERFACE(S)

408 EXTERNAL DEVICE(S)

409 DISPLAY

SINGLE INSTALLATION AND INTELLIGENT MULTI SITE USAGE OF SOFTWARE VIA MOVING EDGE CAPACITY

BACKGROUND

The present invention relates generally to the field of computing, and more particularly to data center deploying edge capacity.

A data center is, typically, a dedicated space to house computer systems that may contain all the necessary software, connectivity for users of an organization to perform their work or support customers/clients. With the explosion of consumer devices, (e.g., smartphones, IoT devices, etc.), the computing resources that were handled by a data center is stretched to the limit. Edge computing moves more computational power and resources closer to end users by increasing the number of endpoints and locating them nearer to the consumers (e.g., users or user devices).

On premise installations are the micro services and deployments that are hosted in a private environment mostly for the benefit of single or group of organizations. In many cases, there may be supporting software like pen test installations or security mechanisms such as NIDPS (Network Intrusion Detection and Prevention Systems) which incurs licensing cost as well as installation and maintenance costs. A "pen" test (ethical hacking), a simulated cyber-attack against your computer network/system to check for vulnerabilities.

SUMMARY

Aspects of the present invention disclose a computer-implemented method, a computer system, and computer program product for dynamically transitioning software associated with client devices in edge computing between one or more data center. The computer implemented method may be implemented by one or more computer processors and may include, retrieving locations for one or more edges associated with one or more data centers; identifying data access location from client devices; determining mobility pattern associated with the data access by the client devices; identifying one or more data center services associated with the mobility pattern; determining one or more solutions associated with the mobility pattern based on an intelligent movement algorithm, the one or more data center services and the data access location; and applying the one or more solutions.

According to another embodiment of the present invention, there is provided a computer system. The computer system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which.

DETAILED DESCRIPTION

Figure 1:
FIG. 1 is a functional block diagram illustrating an edge capacity environment, designated as 100, in accordance with an embodiment of the present invention.

Existing centralized data center infrastructure technology cannot deliver the speeds needed at the edge computing technology. Thus, software installation/capacity between data centers can become a challenge. For example, even if in data center 1, a pen test (i.e., network intrusion test) installation is not used right now and data center 2 needs it—there no easy way to move these from one place to another especially if there are connectivity challenges between these data centers.

Embodiments of the present invention recognizes the deficiencies in the current state of art as it relates to single installation multi-site usage of software via moving edge capacity and provides an approach. One approach involves recognizing that moving computing capacity is part of both source and target data center. The solution can be achieved by using moving far edges. Edges may have capability to install these software and all the associated storage and configuration can be within edge capacity. This allows users to move these software by moving edges between data centers with help of an intelligent configuration tool which can scan the current data center in range and configure the software for that data center. The approach can be scoped to handle MIGRATION or COPY of supporting software such as pen testing tools during the following scenarios: (i) between source and target and there is no public network or private network connectivity and (ii) between source and target and the software are not continuously required in any of the environments.

Some embodiment allows for determining a one-time intelligent installation of multi-site/datacenter software via moving edges and prefetching agents. The same embodiment can identify the edge capacity as dynamic movable capacity. All the supporting software will be installed at that location. System will allow networking between static capacity (data center) and dynamic capacity (edge) via specific network rules.

Some embodiment allows for the admin to carefully select the time period in which each data center needs each of these supporting software. For example, the time period can comprise of, period of the year, day of the month and time of the day—will pre plan the movement of supporting software between the data centers.

Some embodiment allows for having intelligent movement process. For example, intelligent movement means that if the system once identifies that a software needs to be moved from current data center to a new cluster on near future (i.e., in 5 days) then the system will identify the required configurations that system needs to configure this software when its moved to data center 2.

Some embodiment allows for prefetching based on edge movements. For example, the system will pre fetch this information and make available to data center 1's edge and the configurations will be available to the edges in a useful switchable format. These prefetching agents can be specific to supporting software (such as ZAP prefetching agent for ZAP based pen testing). Prefetching agents will also have ability to push the required configuration to actual software when needed such as pushing target API configuration to a Pen test tool for example.

Some embodiment allows for edge movement to be scheduled based on the usage statistics. For example, data center1 will not need it in next 5 days—then system may choose next edge movement within a day to ship the supporting software. If the software is needed until 4th day—system will check whether edge movement time required is just 1 day. If these periods and travel time matches, system will move the 8 software to data center2 on 5th day. The system will also consider the configuration time required.

Some embodiment allows for a step wherein, once the edge reaches—data center 2, the system will try to connect to the data center 2 network. Since the system already has pre-identified configuration of targets within data center 2 network—as soon as it connected—supporting software would be ready to be operated.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.

FIG. 1 is a functional block diagram illustrating an edge capacity environment, designated as 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Edge capacity environment 100 includes network 101, data centers 102 and edge devices 103.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between server 110, data centers 102, edge devices 103 and other computing devices (not shown) within edge capacity environment 100. It is noted that other computing devices can include, but is not limited to, edge devices 103 and any electromechanical devices capable of carrying out a series of computing instructions.

Data centers 102 is a dedicated space to house computer systems that may contain all the necessary software, connectivity for users of an organization to perform their work or support customers/clients.

Edge devices 103 is one or more computing devices that moves more computational power and resources closer to end users by increasing the number of endpoints and locating them nearer to the consumers (e.g., users or user devices).

Edge devices 103 are computing devices (e.g., IoT devices, laptops, smart phone, smart watches, etc.) utilized the users (e.g., business related, consumers, etc.).

Server 110 can be a standalone computing device, a management server, a web server, a mobile computing device, or any other electronic device or computing system capable of receiving, sending, and processing data. In other embodiments, server 110 can represent a server computing system utilizing multiple computers as a server system, such as in a cloud computing environment. In another embodiment, server 110 can be a laptop computer, a tablet computer, a netbook computer, a personal computer (PC), a desktop computer, a personal digital assistant (PDA), a smart phone, or any other programmable electronic device capable of communicating other computing devices (not shown) within edge capacity environment 100 via network 101. In another embodiment, server 110 represents a computing system utilizing clustered computers and components (e.g., database server computers, application server computers, etc.) that act as a single pool of seamless resources when accessed within edge capacity environment 100.

Embodiment of the present invention can reside on server 110, data centers 102 or edge devices 103. Embodiment could be implemented as an extension to the edge computing based clustering methodologies. Server 110 includes capacity component 111 and database 116.

Capacity component 111 provides the capability of identifying the edge capacity as dynamic movable capacity associated with users and data centers. All the supporting software will be installed there (i.e., edge center). Capacity component 111 is able to perform the following based on an intelligent movement algorithm, (i) allow networking between static capacity (i.e., data center) and dynamic capacity (i.e., edge) via specific network rules and (ii) allow the administrator to carefully select the time periods in which each data center needs each of these supporting software. The time periods can be based on the period of the year, day of the month and time of the day—will pre plan the movement of supporting software between data centers.

The functionality of the intelligent movement algorithm can be summarized by the following scenarios. The first scenario involves historical analysis. For example, the system once identifies that a software needs to be moved from current data center to a new cluster on near future (i.e., in 5 days)—the system will identify the required configurations that system needs to configure this software when it's moved to data center 2.

The second scenario involves pre fetching based on edge movements. For example, the system will pre fetch this information and make available to data center 1's edge and the configurations will be available to the edges in a useful switchable format. These prefetching agents can be specific to supporting software (such as ZAP prefetching agent for ZAP based pen testing). Pre fetching agents will also have ability to push the required configuration to actual software when needed such as pushing target API configuration to a pen test tool as an example.

The third scenario involves scheduling edge movement based on usage statistics. For example, data center1 will not need it in next 5 days—then system may choose next edge movement within a day to ship the supporting software. If the software is needed until the 4th day—system will check whether edge movement time required is just 1 day. If these periods and travel time matches, system will move the software to data center 2 on the 5th day. The system will also consider the configuration time required. One the edge reaches—data center 2, it will try to connect to the data center 2 network. Since it already has pre identified configuration of targets within data center 2 network—as soon as it connected—supporting software would be ready to be operated.

Database 116 is a repository for data used by capacity component 111. Database 116 can be implemented with any type of storage device capable of storing data and configuration files that can be accessed and utilized by server 110, such as a database server, a hard disk drive, or a flash memory. Database 116 uses one or more of a plurality of techniques known in the art to store a plurality of information. In the depicted embodiment, database 116 resides on server 110. In another embodiment, database 116 may reside elsewhere within edge capacity environment 100, provided that capacity component 111 has access to database 116. Database 116 may store information associated with, but is not limited to, knowledge corpus, location of data centers, location of edge devices, docking rules, docking capacity, software licenses for all locations/infrastructure, networking rules, security rules, history usage history, network range history, data access history and migration rules/agents.

Figure 2:
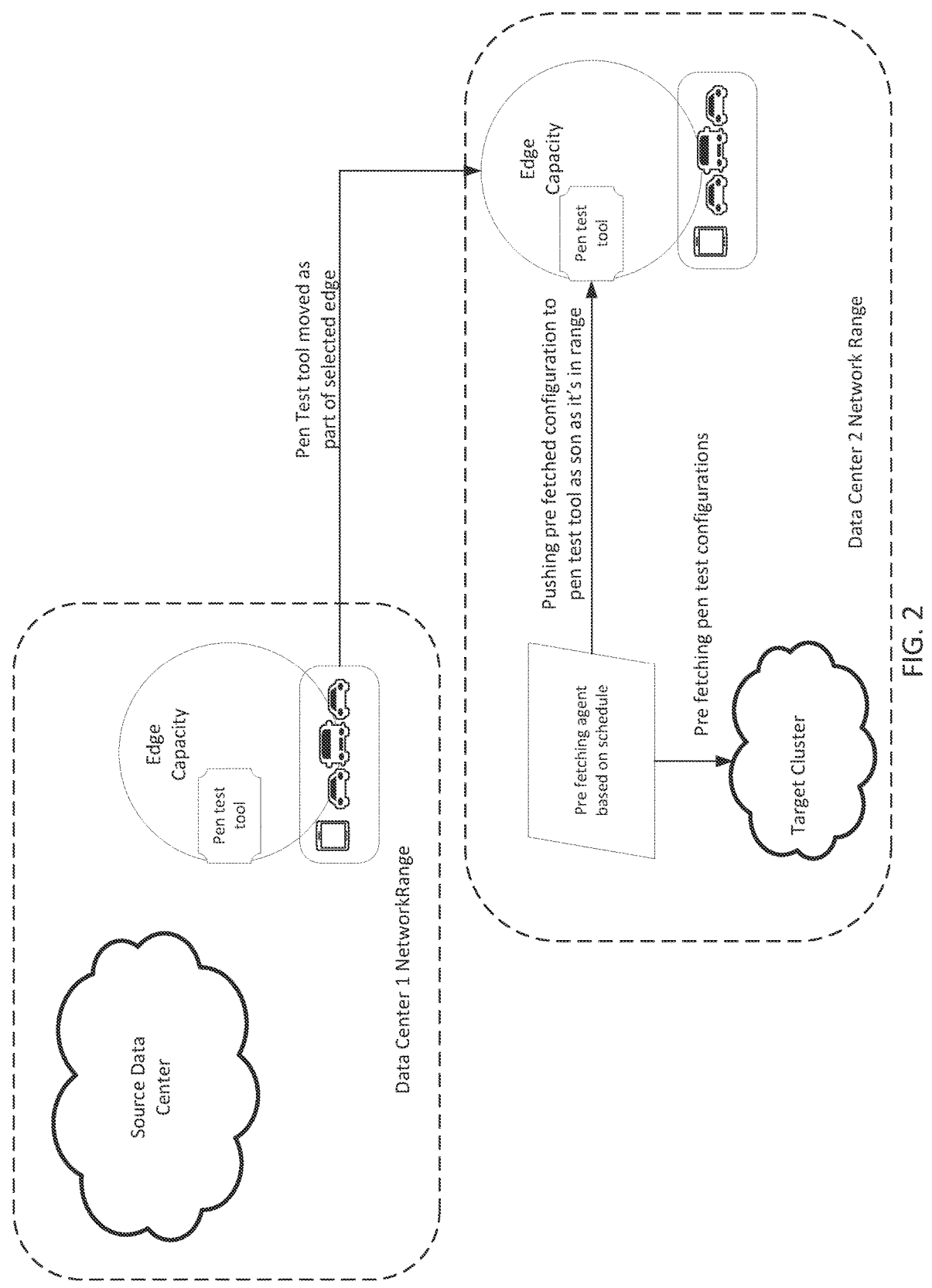
FIG. 2 illustrates an actual implementation of one time installation of multi-site pen test tool using moving edges (via capacity component 111), in accordance with an embodiment of the present invention.

FIG. 2 illustrates an actual implementation of one time installation of multi-site pen test tool using moving edges (via capacity component 111), in accordance with an embodiment of the present invention. There are two data center (e.g., data center 1 and data center 2) with edge capacities unique to each data center. Client devices was originally utilizing services from data center 1 and is moving out of network range of data center 1 (i.e., towards data center 2). As soon as client devices moves within network range of data center 2, capacity component 111 begins to perform pre fetching duties based on the intelligent movement algorithm.

Figure 3:
FIG. 3 is a high-level flowchart illustrating the operation of capacity component 111, designated as 300, in accordance with another embodiment of the present invention.
Figure 3:
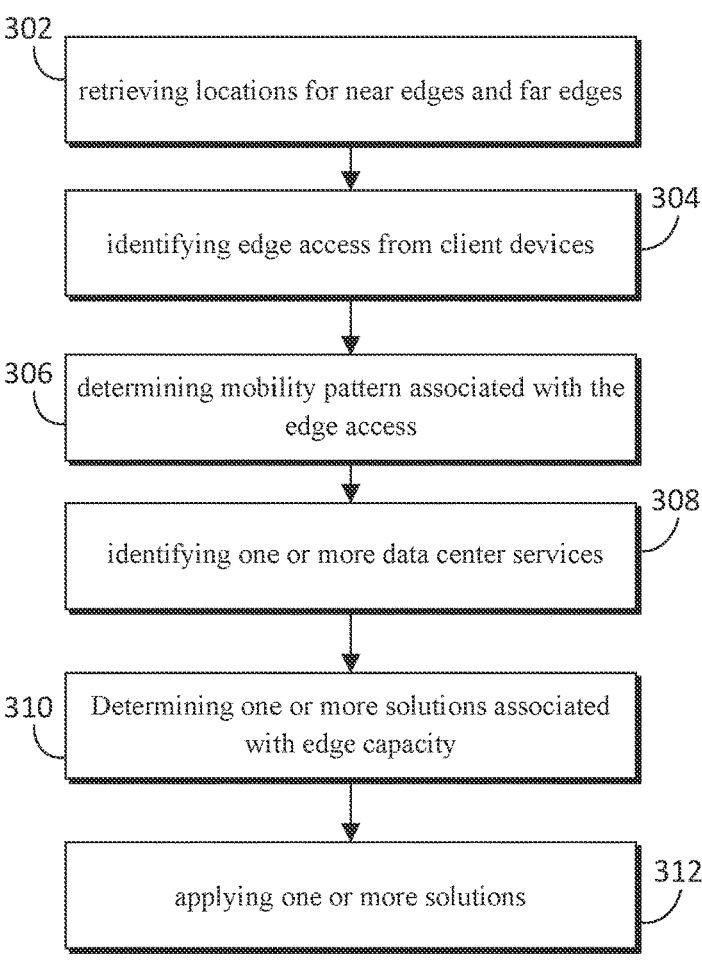

FIG. 3 is a high-level flowchart illustrating the operation of capacity component 111, designated as 300, in accordance with an embodiment of the present invention.

Capacity component 111 retrieves locations for one or more edges (step 302). In an embodiment, capacity component 111, retrieves locations for one or more edges associated with one or more data centers. By knowing the edge location(s) in relation to the data center(s) helps, capacity component 111 understand the network topography of all devices in the computing infrastructure.

Capacity component 111 identifies data access location (step 304). In an embodiment, capacity component 111, identifies a location for data access from client devices (i.e., 104) to the one or more edge devices (i.e., 103). Data access means that client devices is utilizing resources (e.g., applications, storage, etc.) from the computing infrastructure (i.e., from various data centers, etc.). For example, client devices 104 is accessing data/services from data center 1 (refer to FIG. 1) since client devices 104 is within network range of data center 1.

Capacity component 111 determines mobility pattern (step 306). In an embodiment, capacity component 111, determining mobility pattern associated with the client devices. Capacity component 111 may use machine learning to determine the usage statistics between data centers based on data access by client devices. For example, capacity component 111 predicts that client device will travel from the network range of data center 1 to the network range of data center 2 in five days based on historical patterns.

Capacity component 111 identifies one or more data center services (step 308). In an embodiment, capacity component 111, identifying one or more data center services associated with the mobility pattern. These data center services can include, but it is not limited to, software application access, software/network configurations, data storage and security protocols.

Capacity component 111 determines one or more solutions to edge capacity (step 310). In an embodiment, capacity component 111, tries to resolve and find solutions to the edge capacity between the data centers and edge services based on requirements/demands by client devices. Demands from client devices can be determined by dynamic capacity docking. Dynamic capacity may be implemented using movable edges with storage. Edges may be able to dock to a dynamic capacity by entering to a particular physical location and connecting to either a wireless method or using actual pluggable LAN. This capacity is something that can enlarge and shrink based on edge movement plan. Capacity component 111, through intelligent movement algorithm, can identify dynamic capacity in the docking area and proposed a solution of moving required/demanded software to the docked edges. Another possible solution is that transfer and/or movement of software to edges based on the travel plans of edges by scheduling time periods in which these software are required in the target data center.

Another solution may involve a scenario, wherein the DATA CENTER 2 may have already run a pen test within last 3 months or so. In such case, the PRE FETCHING agent may identify the DIFF (i.e., difference). Thus, system can calculate when the SOFTWARE is really required in DATA CENTER 2, and also the travelling time required by edge plus the configuration time. Accordingly, embodiment will select the edge where the software to be moved will be available. Once the EDGE DOCKS to target data center's network, system will configure the software using PRE FETCHED configuration by the agent. Additionally, the system will make sure that the software is available in the expected period itself.

In another solution may involve another scenario, wherein some software are regularly moved, the system will compare the cost to run the frequent migration and recommend user to purchase multiple licenses. In some cases where there are multiple license and system finds that specific software is not frequently used—system may recommend utilizing only 1 license with edge based SOFTWARE MIGRATION.

Capacity component 111 applies the one or more solutions (step 312). In an embodiment, capacity component 111, applies the one or more solutions to resolve edge capacity. For example, one solution may involve a PRE FETCHED configurations of a target: If a data center 2 is expecting a moved pen test tool to be available next week—system may run an agent which will pre fetch the configurations required by the pen test tool even before pen test tool is moved to data center 2.

Figure 4:
FIG. 4 depicts a block diagram, designated as 400, of components of a server computer capable of executing the capacity component 111 within the edge capacity environment 100, in accordance with an embodiment of the present invention.

FIG. 4, designated as 400, depicts a block diagram of components of capacity component 111 application, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data x10) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Capacity component 111 can be stored in persistent storage 405 for access and/or execution by one or more of the respective processor(s) 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., capacity component 111) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., capacity component 111) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

Finally, the proposed concept may be summarized in a nutshell in the following clauses:

1. A system may be implemented by extending traditional cloud centric edge computing architecture.

2. The system could be implemented as an extension to the edge computing based clustering methodologies.

3. Dynamic Capacity Docking: System will allow admin to mark dynamic capacity.

4. Dynamic capacity may be implemented using movable edges with storage.

5. Edges may be able to DOCK to a DYNAMIC capacity by entering to a particular physical location and connecting to either a wireless method or using actual pluggable LAN. Basically this capacity is something that can enlarge and shrink based on edge movement plan.

6. System will allow admin to select the supporting software to be installed in the edges or moved to the edges.

7. System will also allow the admin to select the period in which each data center needs these software.

8. System will identify the dynamic capacity in the docking area.

9. System will keep moving software to the docked edges.

10. System will also influence the movement of software to edges based on the travel plans of edges as well as the scheduled periods in which these software are required in the target data center.

11. Intelligent PRE FETCHED configurations of target: If a data center 2 is expecting a moved PEN TEST tool to be available next week—system may run an agent which will pre fetch the configurations required by the PEN TEST TOOL even before pen test tool is moved to data center 2.

12. This prefetching agent can be moved to target in an earlier period.

13. In some cases DATA CENTER 2 may have already run a PEN TEST within last 3 months or so. In such cases the PREFETCHING agent may identify the DIFF.

14. System will calculate when the SOFTWARE is really required in DATA CENTER 2, and also the travelling time required by edge+ configuration time. Accordingly system will select the edge where the software to be moved will be available.

15. Once the EDGE DOCKS to target data centers network, system will configure the software using PREFETCHED configuration by the agent.

16. System will make sure that the software is available in the expected period itself.

17. In some cases—if some software are regularly moved—system will compare the cost to run the frequent migration and recommend user to purchase multiple licenses.

18. In some cases—if there are multiple license and system finds that SOFTWARE is not frequently used—system may recommend to go for only 1 license with edge based SOFTWARE MIGRATION.

19. The proposed system will identify the edge capacity as dynamic movable capacity. All the supporting software will be installed here. System will allow networking between static capacity (data center) and dynamic capacity (edge) via specific network rules.

20. System will be able to allow the admin to carefully select the periods in which each data center needs each of these supporting software.

21. System based on the period of the year, day of the month and time of the day—will pre plan the movement of supporting software between data centers.

22. Intelligent movement process:

1. System once identifies that a software needs to be moved from current data center to a new cluster on near future (in 5 days for example)—system will identify the required configurations that system needs to configure this software when its moved to data center 2.

2. The pre fetching based on edge movements: System will prefetch this information and make available to data center 1's edge and the configurations will be available to the edges in a useful switchable format. These prefetching agents can be specific to supporting software (such as ZAP prefetching agent for ZAP based pen testing). Pre fetching agents will also have ability to push the required configuration to actual software when needed such as pushing target API configuration to a Pen test tool for example.

3. Edge movement will be scheduled based on the usage statistics. For example data center1 will not need it in next 5 days—then system may choose next edge movement within a day to ship the supporting software. If the software is needed till $4^{th}$ day—system will check whether edge movement time required is just 1 day. If these periods and travel time matches system will move the software to data center2 on $5^{th}$ day. System will also consider the configuration time required.

23. One the edge reaches—datacenter 2, it will try to connect to the data center 2 network. Since it already has pre identified configuration of targets within data center 2 network—as soon as it connected—supporting software would be ready to be operated.

What is claimed is:

1. A computer-implemented method for dynamically transitioning software associated with client devices in edge computing between one or more data centers, the computer-implemented method comprising:

retrieving locations for one or more edges associated with one or more data centers;

identifying data access location associated with the one or more data centers from client devices;

determining a data center historical pattern based on identified software migration to a target location of the one or more data centers;

determining mobility pattern associated with data access by the client devices, wherein determining the mobility pattern associated with the client devices, further comprising:

retrieving a usage history of the data access from the client devices;

analyzing the usage history; and predicting, by machine learning, the target location of the one or more data centers for future data access from the client devices based on, at least, the usage history;

identifying one or more data center services associated with the mobility pattern;

prefetching configurations associated with software based on the mobility pattern, wherein the software is to be used at the target location;

determining one or more solutions associated with the mobility pattern based on an intelligent movement algorithm, the one or more data center services and the data access location; and applying the one or more solutions.

2. The computer-implemented method of claim 1, wherein identifying data access location from client devices, further comprising:

determining a client location associated with the data access to the one or more data centers and/or the one or more edges.

3. The computer-implemented method of claim 1, further comprising:

determining supporting software associated with penetration testing and configurations associated with the supporting software required for a penetration testing for the target location;

determining history usage by the supporting software associated with the penetration testing;

identifying a target date that the supporting software will be used at the target location; and moving the configurations associated with the penetration testing to the target location prior to the target date.

4. The computer-implemented method of claim 3, wherein determining one or more solutions associated with the mobility pattern based on an intelligent movement algorithm, the one or more data center services and the data access location, further comprising:

scheduling a transfer of one or more software required by the client devices from a first data center of the one or more data centers to a second data center of the one or more data centers, wherein the second data center is the target location for the data access.

5. The computer-implemented method of claim 4, wherein the one or more solutions, further comprises of moving the one or more software to a docked edges, transfer of the one or more software by scheduling time periods between the one or more data centers or running a pre-fetching agent to move the one or more software between the one or more data centers.

6. The computer-implemented method of claim 1, wherein the intelligent movement algorithm further comprises, historical analysis, pre-fetching based on edge movements, scheduling edge movement based on usage statistics.

7. The computer-implemented method of claim 1, wherein data center services further comprises, software application access, software/network configurations, data storage and security protocols.

8. A computer program product for dynamically transitioning software associated with client devices in edge computing between one or more data center, the computer program product comprising:

program instructions to retrieve locations for one or more edges associated with one or more data centers;

program instructions to identify data access location associated with the one or more data centers from client devices;

program instructions to determine a data center historical pattern based on identified software migration to a target location of the one or more data centers;

program instructions to determine mobility pattern associated with data access by the client devices, wherein program instructions to determine the mobility pattern associated with the client devices, further comprising:

program instructions to retrieve a usage history of the data access from the client devices;

program instructions to analyze the usage history; and program instructions to predict, by machine learning, the target location of the one or more data centers for future data access from the client devices based on, at least, the usage history;

program instructions to identify one or more data center services associated with the mobility pattern;

program instructions to prefetch configurations associated with software based on the mobility pattern, wherein the software is to be used at the target location;

program instructions to determine one or more solutions associated with the mobility pattern based on an intelligent movement algorithm, the one or more data center services and the data access location; and program instructions to apply the one or more solutions.

9. The computer program product of claim 8, wherein program instructions to identify data access location from client devices, further comprising:

program instructions to determine a client location associated with the data access to the one or more data centers and/or the one or more edges.

10. The computer program product of claim 8, further comprising:

program instructions to determine supporting software associated with penetration testing and configurations associated with the supporting software required for a penetration testing for the target location;

program instructions to determine history usage by the supporting software associated with the penetration testing;

program instructions to identify a target date that the supporting software will be used at the target location; and program instructions to move the configurations associated with the penetration testing to the target location prior to the target date.

11. The computer program product of claim 10, wherein program instructions to determine one or more solutions associated with the mobility pattern based on an intelligent movement algorithm, the one or more data center services and the data access location, further comprising:

program instructions to schedule a transfer of one or more software required by the client devices from a first data center of the one or more data centers to a second data center of the one or more data centers, wherein the second data center is the target location for the data access.

12. The computer program product of claim 11, wherein the one or more solutions, further comprises of moving the one or more software to a docked edges, transfer of the one or more software by scheduling time periods between the one or more data centers or running a pre-fetching agent to move the one or more software between the one or more data centers.

13. The computer program product of claim 8, wherein the intelligent movement algorithm further comprises, historical analysis, pre-fetching based on edge movements, scheduling edge movement based on usage statistics.

14. The computer program product of claim 8, wherein data center services further comprises, software application access, software/network configurations, data storage and security protocols.

15. A computer system for dynamically transitioning mobile client devices in edge computing, the computer system comprising:

one or more computer processors;

one or more computer readable storage media; and program instructions stored on the one or more computer readable storage media for execution by at least one of the one or more computer processors, the program instructions comprising:

program instructions to retrieve locations for one or more edges associated with one or more data centers;

program instructions to identify data access location associated with the one or more data centers from client devices;

program instructions to determine a data center historical pattern based on identified software migration to a target location of the one or more data centers;

program instructions to determine mobility pattern associated with data access by the client devices, wherein program instructions to determine the mobility pattern associated with the client devices, further comprising:

program instructions to retrieve a usage history of the data access from the client devices;

program instructions to analyze the usage history; and program instructions to predict, by machine learning, a target location of the one or more data centers for future data access from the client devices based on, at least, the usage history;

program instructions to identify one or more data center services associated with the mobility pattern;

program instructions to prefetch configurations associated with software based on the mobility pattern, wherein the software is to be used at the target location;

program instructions to determine one or more solutions associated with the mobility pattern based on an intelligent movement algorithm, the one or more data center services and the data access location; and program instructions to apply the one or more solutions.

16. The computer system of claim 15, wherein program instructions to identify data access location from client devices, further comprising:

program instructions to determine a client location associated with the data access to the one or more data centers and/or the one or more edges.

17. The computer system of claim 15, further comprising:

program instructions to determine supporting software associated with penetration testing and configurations associated with the supporting software required for a penetration testing for the target location;

program instructions to determine history usage by the supporting software associated with the penetration testing;

program instructions to identify a target date that the supporting software will be used at the target location; and program instructions to move the configurations associated with the penetration testing to the target location prior to the target date.

18. The computer system of claim 17, wherein program instructions to determine one or more solutions associated with the mobility pattern based on an intelligent movement algorithm, the one or more data center services and the data access location, further comprising:

program instructions to schedule a transfer of one or more software required by the client devices from a first data center of the one or more data centers to a second data center of the one or more data centers, wherein the second data center is the target location for the data access.

19. The computer system of claim 18, wherein the one or more solutions, further comprises of moving the one or more software to a docked edges, transfer of the one or more software by scheduling time periods between the one or more data centers or running a pre-fetching agent to move the one or more software between the one or more data centers.

20. The computer system of claim 15, wherein the intelligent movement algorithm further comprises, historical analysis, pre-fetching based on edge movements, scheduling edge movement based on usage statistics.

\* \* \* \* \*